(12) United States Patent
Yan et al.

(10) Patent No.: US 10,979,180 B2
(45) Date of Patent: Apr. 13, 2021

(54) HYBRID AUTOMATIC REPEAT REQUEST ACKNOWLEDGMENT BUNDLING

(71) Applicant: Lenovo Innovations Limited (Hong Kong), Hong Kong (CN)

(72) Inventors: Zhi Yan, Beijing (CN); Xiaodong Yu, Beijing (CN); Chenxi Zhu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 79 days.

(21) Appl. No.: 16/336,440

(22) PCT Filed: Sep. 23, 2016

(86) PCT No.: PCT/CN2016/099837
§ 371 (c)(1),
(2) Date: Mar. 25, 2019

(87) PCT Pub. No.: WO2018/053790
PCT Pub. Date: Mar. 29, 2018

(65) Prior Publication Data
US 2019/0222359 A1    Jul. 18, 2019

(51) Int. Cl.
*H04L 1/16* (2006.01)
*H04L 1/18* (2006.01)
*H04L 1/00* (2006.01)

(52) U.S. Cl.
CPC .............. *H04L 1/1621* (2013.01); *H04L 1/00* (2013.01); *H04L 1/18* (2013.01); *H04L 1/1812* (2013.01); *H04L 1/1864* (2013.01); *H04L 1/1887* (2013.01)

(58) Field of Classification Search
CPC ... H04L 1/1621; H04L 1/1887; H04L 1/1864; H04L 1/1812
See application file for complete search history.

(56) References Cited

U.S. PATENT DOCUMENTS

2012/0033648 A1*  2/2012  Papasakellariou ...... H04L 1/003
                                                            370/336
2012/0082145 A1*  4/2012  Chen .................... H04L 1/1861
                                                            370/338
(Continued)

FOREIGN PATENT DOCUMENTS

CN        102904698 A      1/2013
CN        103188061 A      7/2013
(Continued)

OTHER PUBLICATIONS

PCT, "International Search Report", dated Jul. 10, 2017, pp. 1-3.
(Continued)

*Primary Examiner* — Rasheed Gidado
(74) *Attorney, Agent, or Firm* — Kunzler Bean & Adamson

(57) ABSTRACT

Apparatuses, methods, and systems are disclosed for hybrid automatic repeat request acknowledgment bundling. One apparatus includes a processor that generates a hybrid automatic repeat request acknowledgment bundle for transmission in a first available feedback resource. In such an apparatus, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments. The apparatus also includes a transmitter that transmits the hybrid automatic repeat request acknowledgment bundle in the first available feedback resource.

16 Claims, 9 Drawing Sheets

(56) References Cited

U.S. PATENT DOCUMENTS

| | | | |
|---|---|---|---|
| 2013/0114474 A1* | 5/2013 | Fu | H04L 1/1635 370/280 |
| 2013/0176920 A1* | 7/2013 | Seo | H04L 1/1861 370/280 |
| 2013/0272157 A1* | 10/2013 | Gao | H04W 52/146 370/252 |
| 2016/0226630 A1 | 8/2016 | Zhang et al. | |
| 2017/0264419 A1* | 9/2017 | Fakoorian | H04L 1/1822 |

FOREIGN PATENT DOCUMENTS

| | | |
|---|---|---|
| CN | 103684705 A | 3/2014 |
| WO | 2016105173 A1 | 6/2016 |

OTHER PUBLICATIONS

PCT, Written Opinion of the International Searching Authority, dated Jul. 10, 2017, pp. 1-3.

\* cited by examiner

700

| Subframe# | 0 | 1 | 2 | 3 | 4 | 5 | 6 | 7 | 8 | 9 |
|---|---|---|---|---|---|---|---|---|---|---|
| MPDCCH | G1 | G2 | G3 | | | | | | | |
| PDSCH | | | D1 | D2 | D3 | | | | | |
| Switch | | | | | | S | | | | S |
| PUCCH | | | | | | | | 1A | 1A | 1A |

FIG. 7

HYBRID AUTOMATIC REPEAT REQUEST ACKNOWLEDGMENT BUNDLING

FIELD

The subject matter disclosed herein relates generally to wireless communications and more particularly relates to hybrid automatic repeat request acknowledgment bundling.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Code Division Multiple Access ("CDMA"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Further Enhancement MTC ("FeMTC"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Machine Type Communication ("MTC"), Multiple Input Multiple Output ("MIMO"), Multi User Shared Access ("MUSA"), Negative-Acknowledgment ("NACK") or ("NAK"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division ("TD"), Time-Division Duplex ("TDD"), Time Division Multiplex ("TDM"), Transmission Time Interval ("TTI"), Transmit ("TX"), Uplink Control Information ("UCI"), User Entity/Equipment ("Mobile Terminal") ("UE"), Uplink ("UL"), Universal Mobile Telecommunications System ("UMTS"), Uplink Pilot Time Slot ("UpPTS"), Ultra-reliable and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, HARQ may be used. Various differences exist between HARQ implementation in FDD systems and TD-LTE. For example, in FDD systems, for a transmission on subframe N, a HARQ-ACK message is sent on subframe N+4. The reason for the 4 subframe delay in the transmission of a HARQ-ACK message may be due to a processing delay of about 3 ms at the receiver. If the HARQ-ACK message is a NAK, retransmission may be scheduled on subframe N+8 for UL transmissions while the DL retransmission may be asynchronous.

In TD-LTE, a time association between the data transmission and the HARQ-ACK may not be maintained due to the variable numbers of DL and UL subframes present in a frame. Specifically, the UL and DL delay between data and HARQ-ACK is dependent on a TDD configuration chosen. Therefore, a fixed delay between a transmission and the HARQ-ACK is not possible in TD-LTE. In TDD, a delay between the transmission and the HARQ-ACK depends on both a TDD configuration and a subframe in which the data was transmitted. A fixed delay cannot be assured because subframes are allocated to DL and UL depending on the configuration. For example, in TDD configuration 1, there are some DL subframes for which the nearest UL subframe (greater than a separation of 4 or more subframes) is 7 subframes away.

In TD-LTE, a number of DL subframes in a frame is not necessarily equal to a number of UL subframes in a frame. For instance, configurations 0-5 have more DL subframes than UL subframes. Consequently, data transmission from multiple DL subframes needs to be acknowledged in a certain UL subframe and vice-versa for certain cases for the UL data transmission. Accordingly, the transmission of multiple HARQ-ACK messages in UL or DL subframes is a unique feature of TD-LTE as compared to FDD. For example, in TDD configuration 1, DL data in subframe 0 and subframe 1 are acknowledged in subframe 7 to avoid further delays. In certain configurations, HARQ-ACK bundling and/or HARQ-ACK multiplexing may be used; however, certain HARQ-ACK bundling and/or HARQ-ACK multiplexing may not be efficient and/or optimal.

BRIEF SUMMARY

Apparatuses for hybrid automatic repeat request acknowledgment bundling are disclosed. Methods and systems also perform the functions of the apparatus. In one embodiment, the apparatus includes a processor that generates a hybrid automatic repeat request acknowledgment bundle for transmission in a first available feedback resource. In such an embodiment, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments. The apparatus also includes a transmitter that transmits the hybrid automatic repeat request acknowledgment bundle in the first available feedback resource.

In one embodiment, the first available feedback resource is predefined or configured by signaling. In a further embodiment, the threshold number of hybrid automatic repeat request acknowledgments is predefined or configured by signaling. In some embodiments, the threshold number of hybrid automatic repeat request acknowledgments is dynamically changed during operation.

In some embodiments, the first hybrid automatic repeat request acknowledgments includes hybrid automatic repeat request acknowledgments corresponding to data received a threshold time duration before the first available feedback resource. In various embodiments, the threshold time duration is predefined or configured by signaling. In certain embodiments, the first available hybrid automatic repeat request acknowledgment bundle includes hybrid automatic repeat request acknowledgments corresponding to data received before the first available feedback resource.

A method for hybrid automatic repeat request acknowledgment bundling, in one embodiment, includes generating a hybrid automatic repeat request acknowledgment bundle for transmission in a first available feedback resource. In such a method, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments. The method also includes transmitting the hybrid automatic repeat request acknowledgment bundle in the first available feedback resource.

In one embodiment, an apparatus includes a receiver that receives a hybrid automatic repeat request acknowledgment bundle in a first available feedback resource. In such an embodiment, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments.

In one embodiment, the apparatus includes a transmitter that transmits information indicating the first available feedback resource. In another embodiment, the receiver receives information indicating the first available feedback resource. In a further embodiment, the apparatus includes a transmitter that transmits information indicating the threshold number of hybrid automatic repeat request acknowledgments. In various embodiments, the receiver receives information indicating the threshold number of hybrid automatic repeat request acknowledgments. In some embodiments, the first hybrid automatic repeat request acknowledgments includes hybrid automatic repeat request acknowledgments corresponding to data transmitted a threshold time duration before the first available feedback resource. In certain embodiments, the apparatus includes a transmitter that transmits information indicating the threshold time duration. In one embodiment, the first available hybrid automatic repeat request acknowledgment bundle includes hybrid automatic repeat request acknowledgments corresponding to data received before the first available feedback resource.

A method for hybrid automatic repeat request acknowledgment bundling, in one embodiment, includes receiving a hybrid automatic repeat request acknowledgment bundle in a first available feedback resource. In such an embodiment, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 illustrates a further embodiment of hybrid automatic repeat request acknowledgment bundling;

DETAILED DESCRIPTION

Figure 1:
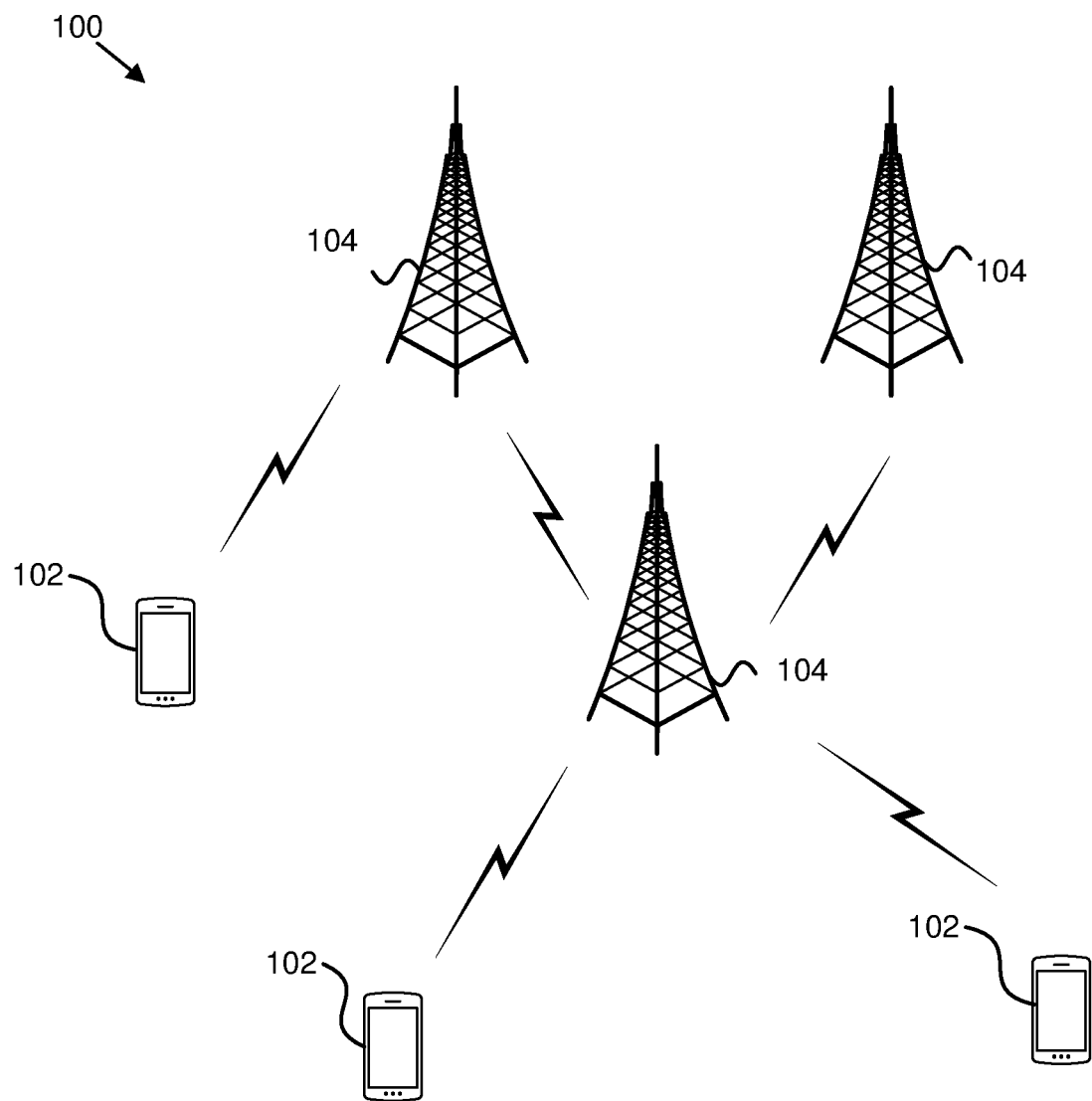
FIG. 1 is a schematic block diagram illustrating one embodiment of a wireless communication system for hybrid automatic repeat request acknowledgment bundling.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for hybrid automatic repeat request acknowledgment bundling. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may generate a hybrid automatic repeat request acknowledgment bundle for transmission in a first available feedback resource (e.g., subframe). In such an embodiment, the hybrid automatic repeat request acknowledgment bundle may include a first number of hybrid automatic repeat request acknowledgements of first hybrid automatic repeat request acknowledgments, and the number of hybrid automatic repeat request acknowledgments may be less than a threshold number of hybrid automatic repeat request acknowledgments. In some embodiments, a first available feedback resource may be a first feedback resource that is able to transmit a hybrid automatic repeat request acknowledgment in response to received data. The remote unit 102 may transmit the hybrid automatic repeat request acknowledgment bundle in the first available feedback resource. Accordingly, a remote unit 102 may transmit a hybrid automatic repeat request acknowledgment bundle.

In another embodiment, a base unit 104 may generate a hybrid automatic repeat request acknowledgment bundle for transmission in a first available feedback resource (e.g., subframe). In such an embodiment, the hybrid automatic repeat request acknowledgment bundle may include a first number of hybrid automatic repeat request acknowledgements of first hybrid automatic repeat request acknowledgments, and the number of hybrid automatic repeat request acknowledgments may be less than a threshold number of hybrid automatic repeat request acknowledgments. In some embodiments, a first available feedback resource may be a first feedback resource that is able to transmit a hybrid automatic repeat request acknowledgment in response to received data. The base unit 104 may transmit the hybrid automatic repeat request acknowledgment bundle in the first available feedback resource. Accordingly, a base unit 104 may transmit a hybrid automatic repeat request acknowledgment bundle.

In a further embodiment, a remote unit 102 may receive a hybrid automatic repeat request acknowledgment bundle in a first available feedback resource (e.g., subframe). In such an embodiment, the hybrid automatic repeat request acknowledgment bundle may include a first number of hybrid automatic repeat request acknowledgements of first hybrid automatic repeat request acknowledgments, and the number of hybrid automatic repeat request acknowledgments may be less than a threshold number of hybrid automatic repeat request acknowledgments. In some embodiments, a first available feedback resource may be a first feedback resource that is able to transmit a hybrid automatic repeat request acknowledgment in response to received data. Accordingly, a remote unit 102 may receive a hybrid automatic repeat request acknowledgment bundle.

In another embodiment, a base unit 104 may receive a hybrid automatic repeat request acknowledgment bundle in a first available feedback resource (e.g., subframe). In such an embodiment, the hybrid automatic repeat request acknowledgment bundle may include a first number of hybrid automatic repeat request acknowledgements of first hybrid automatic repeat request acknowledgments, and the number of hybrid automatic repeat request acknowledgments may be less than a threshold number of hybrid automatic repeat request acknowledgments. In some embodiments, a first available feedback resource may be a first feedback resource that is able to transmit a hybrid automatic repeat request acknowledgment in response to received data. Accordingly, a base unit 104 may receive a hybrid automatic repeat request acknowledgment bundle.

Figure 2:
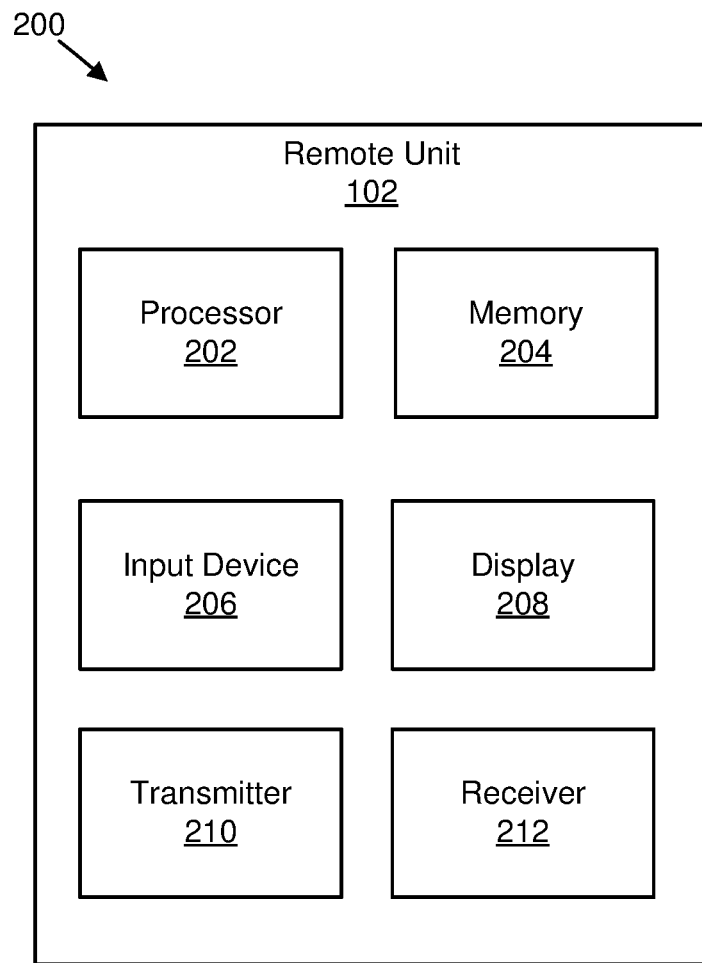
FIG. 2 is a schematic block diagram illustrating one embodiment of an apparatus that may be used for hybrid automatic repeat request acknowledgment bundling.

FIG. 2 depicts one embodiment of an apparatus 200 that may be used for hybrid automatic repeat request acknowledgment bundling. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may generate a hybrid automatic repeat request acknowledgment bundle for transmission in a first available feedback resource.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit a hybrid automatic repeat request acknowledgment bundle in a first available feedback resource. In certain embodiments, the receiver 212 may be used to receive a hybrid automatic repeat request acknowledgment bundle in a first available feedback resource. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
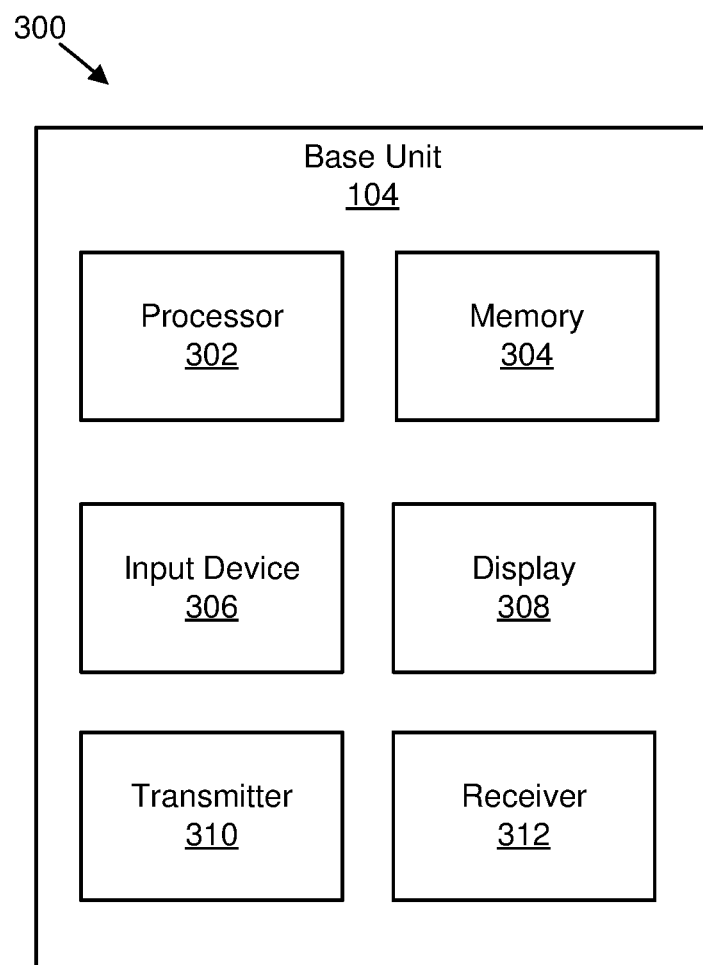
FIG. 3 is a schematic block diagram illustrating one embodiment of an apparatus that may be used for hybrid automatic repeat request acknowledgment bundling.

FIG. 3 depicts one embodiment of an apparatus 300 that may be used for hybrid automatic repeat request acknowledgment bundling. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The processor 302 may be used to generate a hybrid automatic repeat request acknowledgment bundle for transmission in a first available feedback resource. The transmitter 310 may be used to transmit a hybrid automatic repeat request acknowledgment bundle for transmission in a first available feedback resource. The receiver 312 may be used to receive a hybrid automatic repeat request acknowledgment bundle for transmission in a first available feedback resource. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
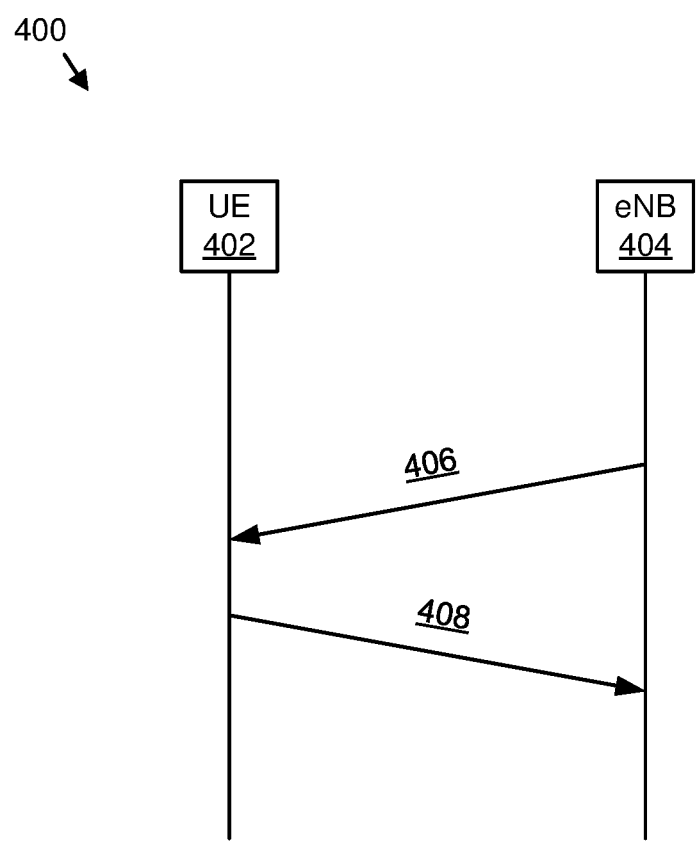
FIG. 4 illustrates one embodiment of communications for hybrid automatic repeat request acknowledgment bundling.

FIG. 4 illustrates one embodiment of communications 400 for hybrid automatic repeat request acknowledgment bundling. Specifically, communications 400 between a UE 402 and an eNB 404 are illustrated. A first communication 406 may be data transmitted from the eNB 404 and received by the UE 402. A second communication 408 includes a HARQ-ACK sent in response to the first communication 406. The second communication 408 may be transmitted from the UE 402 to the eNB 404.

In other embodiments, the first communication 406 may be data transmitted from the UE 402 and received by the eNB 404, and the second communication 408 may include a HARQ-ACK transmitted from the eNB 404 to the UE 402 in response to the first communication 406.

Figure 5:
FIG. 5 illustrates one embodiment of hybrid automatic repeat request acknowledgment bundling.

FIG. 5 is a schematic block diagram illustrating one embodiment of hybrid automatic repeat request acknowledgment bundling 500. In one embodiment, a HARQ-ACK feedback subframe pattern within a cycle period may be defined by signaling (e.g., RRC signaling). In another embodiment, the HARQ-ACK feedback subframe pattern within a cycle period may be configured by a specification and/or may be preconfigured. In the illustrated embodiment, the HARQ-ACK feedback subframe pattern includes subframe #s 11 and 24.

In some embodiments, the HARQ-ACK for corresponding data is transmitted in the next available HARQ-ACK feedback subframe if a combination of HARQ-ACKs able to be transmitted in the next available HARQ-ACK feedback subframe is less than or equal to a threshold number of HARQ-ACKs M. In the illustrated embodiment, the threshold number of HARQ-ACKs M is 8, while in other embodiments, the threshold number of HARQ-ACKs M may be any suitable value (e.g., 1, 2, 3, 4, 5, 6, 7, 8, 9, 10, 11, 12, or more). In one embodiment, the threshold number of HARQ-ACKs M may be defined by signaling (e.g., RRC signaling). In another embodiment, the threshold number of HARQ-ACKs M may be configured by a specification and/or may be preconfigured. In certain embodiments, the threshold number of HARQ-ACKs M may be modified during operation based on a communication link performance. For example, if a communication link has a great performance, the threshold number of HARQ-ACKs M may be 8; if a communication link has a mediocre performance, the threshold number of HARQ-ACKs M may be 4; and if a communication link has a poor performance, the threshold number of HARQ-ACKs M may be 1. In some embodiments, different HARQ-ACK feedback subframes may have a different threshold number of HARQ-ACKs M.

If the combination of HARQ-ACKs able to be transmitted in the next available HARQ-ACK feedback subframe is greater than the predefined number M, the excess HARQ-ACKs are transmitted in an available HARQ-ACK feedback subframe following the next available HARQ-ACK feedback subframe. As may be appreciated, a next available HARQ-ACK feedback subframe may be a subframe that is a threshold number of subframes N (i.e., threshold time duration) after corresponding data is transmitted. In the illustrated embodiment, the threshold number of subframes N is 4, while in other embodiments, the threshold number of subframes N may be any suitable value (e.g., 1, 2, 3, 4, 5, 6, 7, 8, or more). In one embodiment, the threshold number of subframes N may be defined by signaling (e.g., RRC signaling). In another embodiment, the threshold number of subframes N may be configured by a specification and/or may be preconfigured.

In the illustrated embodiment, subframe #11 is the first available feedback subframe for PDSCH data D1, D2, D3, D4, D5, and D6 because subframe #11 is the first at least the threshold number of subframes N (4 subframes) after each of D1, D2, D3, D4, D5, and D6. Subframe #11 is not the first available feedback subframe for PDSCH data D7 and D8 because subframe #11 is less than the threshold number of subframes N after D7 and D8. Subframe #24 is the first available feedback subframe for PDSCH data D7 and D8. Because there are only 6 HARQ-ACKs available to be transmitted in subframe #11, and 6 is less than or equal to the predefined number M (M=8), all 6 HARQ-ACKs may be bundled together and transmitted in subframe #11.

Moreover, subframe #24 is the first available subframe for PDSCH data D7, D8, D9, D10, D11, D12, D13, and D14. Because there are only 8 HARQ-ACKs available to be transmitted in subframe #24, and 6 is less than or equal to the predefined number M (M=8), all 6 HARQ-ACKs may be bundled together and transmitted in subframe #24.

Figure 6:
FIG. 6 illustrates another embodiment of hybrid automatic repeat request acknowledgment bundling.

FIG. 6 is a schematic block diagram illustrating another embodiment of hybrid automatic repeat request acknowledgment bundling 600. In one embodiment, a HARQ-ACK feedback subframe pattern within a cycle period may be defined by signaling (e.g., RRC signaling). In another embodiment, the HARQ-ACK feedback subframe pattern within a cycle period may be configured by a specification and/or may be preconfigured. In the illustrated embodiment, the HARQ-ACK feedback subframe pattern includes subframe #s 11, 12, 25, and 26.

In some embodiments, the HARQ-ACK for corresponding data is transmitted in the next available HARQ-ACK feedback subframe if a combination of HARQ-ACKs able to be transmitted in the next available HARQ-ACK feedback subframe is less than or equal to a threshold number of HARQ-ACKs M. In the illustrated embodiment, the threshold number of HARQ-ACKs M is 4, while in other embodiments, the threshold number of HARQ-ACKs M may be any suitable value (e.g., 1, 2, 3, 4, 5, 6, 7, 8, 9, 10, 11, 12, or more). In one embodiment, the threshold number of HARQ-ACKs M may be defined by signaling (e.g., RRC signaling). In another embodiment, the threshold number of HARQ-ACKs M may be configured by a specification and/or may be preconfigured. In certain embodiments, the threshold number of HARQ-ACKs M may be modified during operation based on a communication link performance. For example, if a communication link has a great performance, the threshold number of HARQ-ACKs M may be 8; if a communication link has a mediocre performance, the threshold number of HARQ-ACKs M may be 4; and if a communication link has a poor performance, the threshold number of HARQ-ACKs M may be 1. In some embodiments, different HARQ-ACK feedback subframes may have a different threshold number of HARQ-ACKs M.

If the combination of HARQ-ACKs able to be transmitted in the next available HARQ-ACK feedback subframe is greater than the predefined number M, the excess HARQ-ACKs are transmitted in an available HARQ-ACK feedback subframe following the next available HARQ-ACK feedback subframe. As may be appreciated, a next available HARQ-ACK feedback subframe may be a subframe that is a threshold number of subframes N after corresponding data is transmitted. In the illustrated embodiment, the threshold number of subframes N is 4, while in other embodiments, the threshold number of subframes N may be any suitable value (e.g., 1, 2, 3, 4, 5, 6, 7, 8, or more). In one embodiment, the threshold number of subframes N may be defined by signaling (e.g., RRC signaling). In another embodiment, the threshold number of subframes N may be configured by a specification and/or may be preconfigured.

In the illustrated embodiment, subframe #11 is the first available feedback subframe for PDSCH data D1, D2, D3, D4, D5, and D6 because subframe #11 is at least the threshold number of subframes N (4 subframes) after each of D1, D2, D3, D4, D5, and D6. Subframe #11 is not the first available subframe for PDSCH data D7 and D8 because subframe #11 is less than the threshold number of subframes N after D7 and D8. Subframe #12 is the first available subframe for PDSCH data D7, and subframe #25 is the first available subframe for PDSCH data D8. Because there are 6 HARQ-ACKs available to be transmitted in subframe #11, and 6 is greater than the predefined number M (M=4), only the first four HARQ-ACKs (e.g., HARQ-ACKs corresponding to D1, D2, D3, and D4) may be bundled together and transmitted in subframe #11. Moreover, because there are 3 remaining HARQ-ACKs available to be transmitted in subframe #12, and 3 is less than or equal to the predefined number M (M=4), the 3 remaining HARQ-ACKs (e.g., HARQ-ACKs corresponding to D5, D6, and D7) may be bundled together and transmitted in subframe #12.

Moreover, subframe #25 is the first available subframe for PDSCH data D8, D9, D10, D11, D12, D13, and D14. Because there are 7 HARQ-ACKs available to be transmitted in subframe #25, and 7 is greater than the predefined number M (M=4), only the first four HARQ-ACKs (e.g., HARQ-ACKs corresponding to D8, D9, D10, and D11) may be bundled together and transmitted in subframe #25. Moreover, because there are 4 remaining HARQ-ACKs available to be transmitted in subframe #26, and 4 is less than or equal to the predefined number M (M=4), the 4 remaining HARQ-ACKs (e.g., HARQ-ACKs corresponding to D12, D13, D14, and D15) may be bundled together and transmitted in subframe #25.

FIG. 7 is a schematic block diagram illustrating a further embodiment of hybrid automatic repeat request acknowledgment bundling 700. In one embodiment, a HARQ-ACK feedback subframe pattern within a cycle period may be defined by signaling (e.g., RRC signaling). In another embodiment, the HARQ-ACK feedback subframe pattern within a cycle period may be configured by a specification and/or may be preconfigured. In the illustrated embodiment, the HARQ-ACK feedback subframe pattern includes subframe #s 6, 7, and 8.

In some embodiments, the HARQ-ACK for corresponding data is transmitted in the next available HARQ-ACK feedback subframe if a combination of HARQ-ACKs able to be transmitted in the next available HARQ-ACK feedback subframe is less than or equal to a threshold number of HARQ-ACKs M. In the illustrated embodiment, the threshold number of HARQ-ACKs M is 1, while in other embodiments, the threshold number of HARQ-ACKs M may be any suitable value (e.g., 1, 2, 3, 4, 5, 6, 7, 8, 9, 10, 11, 12, or more). In one embodiment, the threshold number of HARQ-ACKs M may be defined by signaling (e.g., RRC signaling). In another embodiment, the threshold number of HARQ-ACKs M may be configured by a specification and/or may be preconfigured. In certain embodiments, the threshold number of HARQ-ACKs M may be modified during operation based on a communication link performance. For example, if a communication link has a great performance, the threshold number of HARQ-ACKs M may be 8; if a communication link has a mediocre performance, the threshold number of HARQ-ACKs M may be 4; and if a communication link has a poor performance, the threshold number of HARQ-ACKs M may be 1. In some embodiments, different HARQ-ACK feedback subframes may have a different threshold number of HARQ-ACKs M.

If the combination of HARQ-ACKs able to be transmitted in the next available HARQ-ACK feedback subframe is greater than the predefined number M, the excess HARQ-ACKs are transmitted in an available HARQ-ACK feedback subframe following the next available HARQ-ACK feedback subframe. As may be appreciated, a next available HARQ-ACK feedback subframe may be a subframe that is a threshold number of subframes N after corresponding data is transmitted. In the illustrated embodiment, the threshold number of subframes N is 4, while in other embodiments, the threshold number of subframes N may be any suitable value (e.g., 1, 2, 3, 4, 5, 6, 7, 8, or more). In one embodiment, the threshold number of subframes N may be defined by signaling (e.g., RRC signaling). In another embodiment, the threshold number of subframes N may be configured by a specification and/or may be preconfigured.

In the illustrated embodiment, subframe #6 is the first available feedback subframe for PDSCH data D1 because subframe #6 is at least the threshold number of subframes N (4 subframes) after D1. Subframe #6 is not the first available feedback subframe for PDSCH data D2 and D3 because subframe #6 is less than the threshold number of subframes N after D2 and D3. Subframe #7 is the first available feedback subframe for PDSCH data D2, and subframe #8 is the first available feedback subframe for PDSCH data D3. Because there is only 1 HARQ-ACKs available to be transmitted in subframe #6, and 1 is less than or equal to the predefined number M (M=4), only one HARQ-ACK (e.g., HARQ-ACK corresponding to D1) may be transmitted in subframe #6. Because there is only 1 HARQ-ACKs available to be transmitted in subframe #7, and 1 is less than or equal to the predefined number M (M=4), only one HARQ-ACK (e.g., HARQ-ACK corresponding to D2) may be transmitted in subframe #7. Because there is only 1 HARQ-ACKs available to be transmitted in subframe #8, and 1 is less than or equal to the predefined number M (M=4), only one HARQ-ACK (e.g., HARQ-ACK corresponding to D3) may be transmitted in subframe #8.

Figure 8:
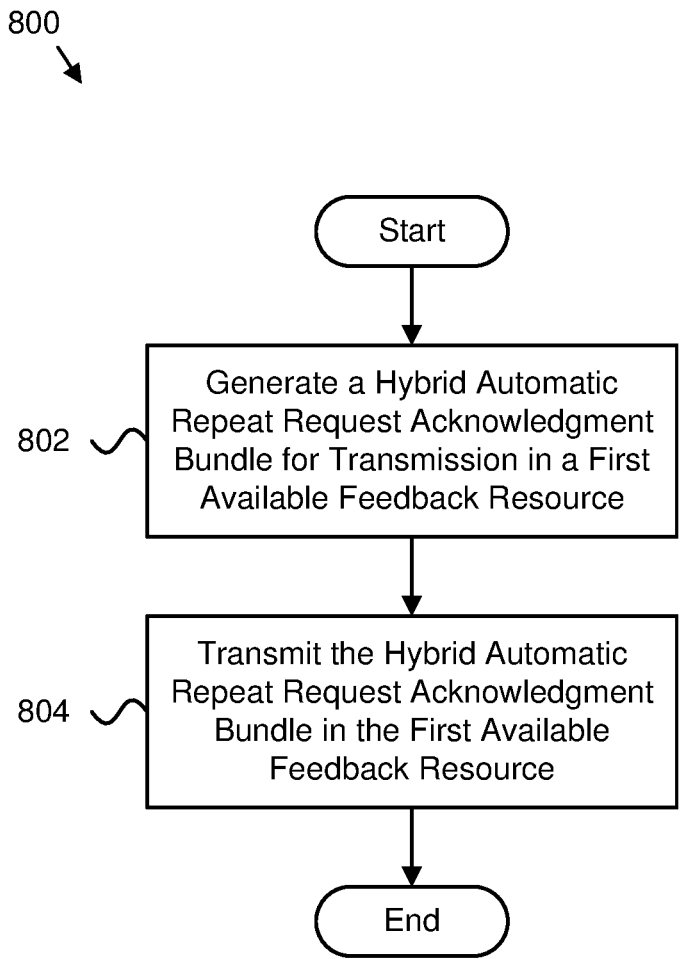
FIG. 8 is a schematic flow chart diagram illustrating one embodiment of a method for hybrid automatic repeat request acknowledgment bundling.

FIG. 8 is a schematic flow chart diagram illustrating one embodiment of a method 800 for hybrid automatic repeat request acknowledgment bundling. In some embodiments, the method 800 is performed by an apparatus, such as the remote unit 102 or the base unit 104. In certain embodiments, the method 800 may be performed by a processor executing program code, for example, a microcontroller, a microprocessor, a CPU, a GPU, an auxiliary processing unit, a FPGA, or the like.

The method 800 may include generating 802 a hybrid automatic repeat request acknowledgment bundle for transmission in a first available feedback resource. In such a method, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments. The method 800 also includes transmitting 804 the hybrid automatic repeat request acknowledgment bundle in the first available feedback resource.

In one embodiment, the first available feedback resource is predefined or configured by signaling. In a further embodiment, the threshold number of hybrid automatic repeat request acknowledgments is predefined or configured by signaling. In some embodiments, the threshold number of hybrid automatic repeat request acknowledgments is dynamically changed during operation.

In some embodiments, the first hybrid automatic repeat request acknowledgments includes hybrid automatic repeat request acknowledgments corresponding to data received a threshold time duration before the first available feedback resource. In various embodiments, the threshold time duration is predefined or configured by signaling. In certain embodiments, the first available hybrid automatic repeat request acknowledgment bundle includes hybrid automatic repeat request acknowledgments corresponding to data received before the first available feedback resource.

Figure 9:
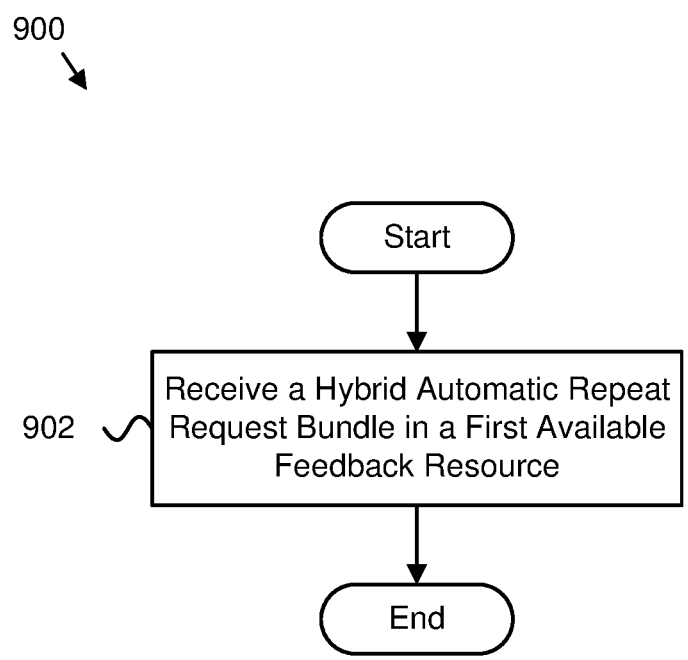
FIG. 9 is a schematic flow chart diagram illustrating another embodiment of a method for hybrid automatic repeat request acknowledgment bundling.

FIG. 9 is a schematic flow chart diagram illustrating another embodiment of a method 900 for hybrid automatic repeat request acknowledgment bundling. In some embodiments, the method 900 is performed by an apparatus, such as the remote unit 102 or the base unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a hybrid automatic repeat request acknowledgment bundle in a first available feedback resource. In such a method, the hybrid automatic repeat request acknowledgment bundle includes a first number of hybrid automatic repeat request acknowledgements of first hybrid automatic repeat request acknowledgments, and the number of hybrid automatic repeat request acknowledgments is less than a threshold number of hybrid automatic repeat request acknowledgments.

In one embodiment, the method 900 includes transmitting information indicating the first available feedback resource. In another embodiment, the method 900 includes receiving information indicating the first available feedback resource. In a further embodiment, the method 900 includes transmitting information indicating the threshold number of hybrid automatic repeat request acknowledgments. In various embodiments, the method 900 includes receiving information indicating the threshold number of hybrid automatic repeat request acknowledgments. In some embodiments, the first hybrid automatic repeat request acknowledgments includes hybrid automatic repeat request acknowledgments corresponding to data transmitted a threshold time duration before the first available feedback resource. In certain embodiments, the method 900 includes transmitting information indicating the threshold time duration. In one embodiment, the first available hybrid automatic repeat request acknowledgment bundle includes hybrid automatic repeat request acknowledgments corresponding to data received before the first available feedback resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that generates a hybrid automatic repeat request acknowledgment bundle for transmission in a first available feedback resource, wherein the hybrid automatic repeat request acknowledgment bundle comprises a first number of hybrid automatic repeat request acknowledgements of first hybrid automatic repeat request acknowledgments, resources of data corresponding to the first hybrid automatic repeat request acknowledgments are at least a threshold time duration before the first available feedback resource, and the first number of hybrid automatic repeat request acknowledgments is less than or equal to a threshold number of hybrid automatic repeat request acknowledgments; and
a transmitter that transmits the hybrid automatic repeat request acknowledgment bundle in the first available feedback resource.

2. The apparatus of claim 1, wherein the first available hybrid automatic repeat request acknowledgment bundle comprises hybrid automatic repeat request acknowledgments corresponding to data received before the first available feedback resource subframe.

3. A method comprising:
generating a hybrid automatic repeat request acknowledgment bundle for transmission in a first available feedback resource, wherein the hybrid automatic repeat request acknowledgment bundle comprises a first number of hybrid automatic repeat request acknowledgements of first hybrid automatic repeat request acknowledgments, resources of data corresponding to the first hybrid automatic repeat request acknowledgments are at least a threshold time duration before the first available feedback resource, and the first number of hybrid automatic repeat request acknowledgments is less than or equal to a threshold number of hybrid automatic repeat request acknowledgments; and
transmitting the hybrid automatic repeat request acknowledgment bundle in the first available feedback resource.

4. The method of claim 3, wherein the first available feedback resource is predefined or configured by signaling.

5. The method of claim 3, wherein the threshold number of hybrid automatic repeat request acknowledgments is predefined or configured by signaling.

6. The method of claim 3, wherein the threshold number of hybrid automatic repeat request acknowledgments is dynamically changed during operation.

7. The method of claim 3, wherein the threshold time duration is predefined or configured by signaling.

8. The method of claim 3, wherein the first available hybrid automatic repeat request acknowledgment bundle comprises hybrid automatic repeat request acknowledgments corresponding to data received before the first available feedback resource.

9. An apparatus comprising:
a receiver that receives a hybrid automatic repeat request acknowledgment bundle in a first available feedback resource, wherein the hybrid automatic repeat request acknowledgment bundle comprises a first number of hybrid automatic repeat request acknowledgements of first hybrid automatic repeat request acknowledgments, resources of data corresponding to the first hybrid automatic repeat request acknowledgments are at least a threshold time duration before the first available feedback resource, and the first number of hybrid automatic repeat request acknowledgments is less than or equal to a threshold number of hybrid automatic repeat request acknowledgments.

10. The apparatus of claim 9, further comprising a transmitter that transmits information indicating the threshold number of hybrid automatic repeat request acknowledgments.

11. A method comprising:
receiving a hybrid automatic repeat request acknowledgment bundle in a first available feedback resource, wherein the hybrid automatic repeat request acknowledgment bundle comprises a first number of hybrid automatic repeat request acknowledgements of first hybrid automatic repeat request acknowledgments, resources of data corresponding to the first hybrid automatic repeat request acknowledgments are at least a threshold time duration before the first available feedback resource, and the first number of hybrid automatic repeat request acknowledgments is less than a threshold number of hybrid automatic repeat request acknowledgments.

12. The method of claim 11, further comprising transmitting information indicating the first available feedback resource.

13. The method of claim 11, further comprising receiving information indicating the first available feedback resource.

14. The method of claim 11, further comprising receiving information indicating the threshold number of hybrid automatic repeat request acknowledgments.

15. The method of claim 11, further comprising transmitting information indicating the threshold time duration.

16. The method of claim 11, wherein the first available hybrid automatic repeat request acknowledgment bundle comprises hybrid automatic repeat request acknowledgments corresponding to data received before the first available feedback resource.

* * * * *